United States Patent [19]

Hirsbrunner

[11] Patent Number: 4,743,288

[45] Date of Patent: May 10, 1988

[54] TREATMENT OF SOIL

[75] Inventor: Pierre Hirsbrunner, Les Monts-de-Corsier, Switzerland

[73] Assignee: SAREA AG, Cham, Switzerland

[21] Appl. No.: 632,130

[22] Filed: Jul. 18, 1984

Related U.S. Application Data

[63] Continuation-in-part of Ser. No. 532,074, Sep. 14, 1983, abandoned.

[30] Foreign Application Priority Data

Aug. 29, 1983 [EP] European Pat. Off. ........ 83108486-8

[51] Int. Cl.$^4$ .............................................. C05C 9/02
[52] U.S. Cl. ......................................... 71/28; 71/903; 405/264; 106/900
[58] Field of Search ................... 405/264; 166/295; 71/27, 28, 903; 106/900

[56] References Cited

U.S. PATENT DOCUMENTS

| | | | |
|---|---|---|---|
| 3,180,097 | 4/1965 | McDowell | 106/900 X |
| 3,208,226 | 9/1965 | Falvey | 106/900 X |
| 3,391,542 | 7/1968 | Herrick et al. | 405/264 |
| 3,495,412 | 2/1970 | Sakata et al. | 405/264 |
| 3,611,733 | 10/1971 | Eilers et al. | 405/264 |

FOREIGN PATENT DOCUMENTS

| | | | |
|---|---|---|---|
| 46-04786 | 2/1971 | Japan | 405/264 |
| 50-31725 | 10/1975 | Japan | 405/264 |
| 3027304 | 1/1983 | Japan | 405/264 |

OTHER PUBLICATIONS

Translation of Japanese Patent 58-27304, Hasegawa, et al., 6/8/83.

Primary Examiner—Ferris H. Lander
Attorney, Agent, or Firm—Vogt & O'Donnell

[57] ABSTRACT

A process for treating soil which comprises applying to the soil an aqueous solution of a formaldehyde-based pre-condensate containing a condensation initiator in an amount sufficient for condensation to be completed within a predetermined period of time not exceeding 24 hours. Preferably a urea-formaldehyde pre-condensate is used. Advantageously the solution also contains a polysaccharide (alginic acid, alginate, low methoxyl pectin, gum karaya, gum arabic) which is capable of forming a gel with divalent metal cations, particularly calcium, present in soil.

The treated soil has improved erosion resistance.

14 Claims, No Drawings

TREATMENT OF SOIL

This application is a continuation-in-part of application Ser. No. 532,074, filed Sept. 14, 1983, and now abandoned, the contents of which are incorporated herein by reference.

This invention is concerned with the treatment of soil.

Soil used for agricultural and other purposes is in many parts of the world subject to erosion by the elements, wind and water, especially if it is light and/or sandy. Such atmospheric erosion has been combatted in two principal ways—by planting suitable plants which bind the upper layers of the soil, or by applying a coating of bitumen which binds the surface for a given period of time.

However, planting is not really suitable where the land subject to erosion is to be used for agricultural purposes, and bitumen is not totally satisfactory because it is not easy to apply and moreover, it leaves residues that are not decomposed over long periods of time.

In accordance with the present invention, there is provided a process for treating soil which overcomes the disadvantages noted above. The process comprises applying to the soil an aqueous solution of a formaldehyde-based precondensate containing a condensation initiator in an amount sufficient for condensation to be completed within a predetermined period of time not exceeding 24 hours. The pH of the solution is either below 5 when an acidic initiator is used or above 10 when the initiator is alkaline. Urea-formaldehyde pre-condensates are preferred although melamine-formaldehye products may also be envisaged.

Apart from affording effective protection against wind and water erosion, which will be demonstrated in greater detail hereafter, the pre-condensate, hereinafter referred to for convenience as "binder" presents additional advantages. The first among these is its auto-degradation within a relatively short, but predetermined, period of time without leaving residues and, additionally, providing a useful supply of nitrogen in the urea present. Secondly, its application, in aqueous solution, is extremely simple as compared with bitumen, which requires special equipment which has to be scrupulously cleaned after use.

The initiator may be any of the substances known for the purpose, in particular an acid. Particularly preferred is phosphoric acid for it will ultimately supply phosphorus to the treated soil. Alternatively an alkaline initiator such as sodium or potassium hydroxide, ammonia or lime (calcium oxide, or hydroxide) may also be used.

Apart from the principal ingredients, the binder and the initiator, the solution applied to the soil may contain one or more additives at a total level of up to 20% by weight. For example, various fillers (spent coffee grounds, humic acids, charcoal), pigments, stabilisers and thickening agents may be added, as well as buffers, fertilisers, mineral salts and various plant protection agents. Each of these will be selected having regard to the desired effect to be produced. Thus, for example, substances broadly described as stabilisers and/or thickening agents include vegetable gums. Their functions include acting as suspending agents for water-in-soluble components and to control the rate of penetration of the treatment solution by modifying its viscosity; viscosity modification may also influence the setting rate. The buffers, including phosphate ($X_2H/XH_2$), borate/boric acid, acetate and formate, for preference, stabilise the solution and thus control the setting rate of the binder, preventing premature condensation which could cause serious problems of equipment clogging. Moreover, it has been found that certain substances which can be used as stabilisers and/or thickening agents, specifically polysaccharides which form gels with divalent metal cations such as calcium and magnesium, are particularly useful additives. These polysaccharides, which include alginic acid and alginates, low methoxyl pectins, gum karaya and gum arabic (*acacia*), on contact with the divalent ions present in soil, especially calcium, produce a thin gel layer at the surface which binds the soil particles. The solution thus does not penetrate deeply into the soil, which means that the amount of binder applied per unit of surface area may be reduced. When these gel-forming polysaccharides are incorporated in the solution, an acidic condensation initiator should be used so that the metal ions in the soil can be liberated. In addition, to avoid an excessive viscosity increase of the binder solution which might be caused by the presence of the polysaccharide, especially alginate or alginic acid, it is advantageous to retard its hydration by incorporating a hydroxy compound such as a lower ($C_1$–$C_4$)alkanol, a glycol (glycerol, ethylene or propylene glycol), a glycol ether, or a polyoxyethylene glycol ether. Thus, the solution as prepared (prior to any dilution by the user) may typically have the following composition, in parts by weight:

Urea-formaldehyde pre-condensate (dry basis): 50
Polysaccharide: 2–20
Hydroxy compound: 0–60
Water: 50–150

> It should be noted that when the polysaccharide is an alginate or alginic acid and its concentration does not exceed about 1% by weight there is no need to add the hydroxy compound. Thereafter, with increasing concentration more hydroxy compound is added in place of the water.

In practice, the soil treatment solution is most conveniently presented to the user as two separate components or units, one containing the pre-condensate, with various additives as appropriate, and the other, the initiator, again with whatever additives are indicated or desired. More specifically, the pre-condensate is usually stabilised by pH adjustment with an alkali, usually sodium hydroxide, to a value preferably in the range 7.0 to 10.0. One or more buffers may also be incorporated with the pre-condensate, mainly to inhibit excessively fast condensation should too large a quantity of initiator be added by the user. The pre-condensate solution may also contain any of the additives listed above. This first component usually contains 15 to 60% by weight of pre-condensate and a corresponding amount of buffer(s) to maintain a pH in the preferred range indicated above. Since the pre-condensate solution is normally presented to the user as a concentrate, it is recommended that it be diluted, prior to addition of initiator, usually with 2 to 40 volumes of water per volume of solution. The actual dilution will be determined by the user, having regard to the spraying equipment available and the amount of pre-condensate to be applied per unit of surface area. Concentrates containing a gel-forming polysaccharide are preferably diluted in such a proportion that the solution applied to the soil contains 0.05 to 0.5% by weight of the polysaccharide.

The second component consists of the initiator, usually without any additives. To avoid risks of excessive corrosion of the user's equipment and facilitate measuring, the acid or alkali is preferably diluted to suitable strength, although excessive dilution is undesirable as large volumes of water will need to be transported. As a rough guide, the amount of initiator in one unit should be sufficient for one unit of the pre-condensate, that is, on mixing the two the pH will be sufficiently low (or high) for condensation to be completed within a predetermined minimum period of time. This period will take into account the total size of the batch, the time required to apply it to the soil (most frequently by spraying) and leave a sufficient safety margin for unforeseen events, so that the user still has time to clean his equipment before total solidification of the urea base resin. In most cases, a final pH of 2 to 5 or above 10, preferably $\geq 12$ depending on the initiator, is adequate to provide a total setting time, from mixing, of 1.5 to 24 hours. Of course, the user may add less initiator per batch to extend the setting time or an additional amount to accelerate the reaction. It should merely be borne in mind that below pH 2 the reaction is likely to be extremely fast. It is also temperature-dependent and precautions should therefore be taken during hot weather.

The prepared solution, as noted, is most conveniently applied by spraying, with tractor-mounted equipment conventionally used for treating crops. The solution is most beneficially applied during the spring, after sowing, at a rate such that the film remains intact until the foliage of plants in adjacent rows has covered the empty space in between. For most crops, this time period lies between 3 and 10 weeks, so that when erosion conditions are also taken into account the binder would commonly be applied at a rate of 100 to 500 kg per hectare (10–50 g/m$^2$). When the binder contains a gel-forming polysaccharide it may be applied in amounts as low as 50 kg/hectare.

In addition to the major use, for protecting soil against erosion and supplying assimilable nitrogen, a urea-base binder affords additional advantages. Thus, by providing a continuous film on the surface of the ground a "greenhouse effect" may be obtained, in that moisture is trapped below the surface and evaporative cooling of the soil is also diminished. Moreover, by incorporating a dark pigment, absorption of solar energy is enhanced, again warming the soil and thus promoting growth.

Tests have also been carried out to determine the effect of the film on germination, its compatibility with various plant protection agents (pesticides) and fertilisers, and its effect as a bird repellent, such as by incorporating suitably odoured substances in the solution prior to application. Absence of phytotoxicity has been confirmed and the film has been demonstrated that it leaves no residues in the soil, its degradation products being totally assimilable by plant life.

The invention is illustrated by the following examples in which parts and percentages are expressed by weight unless stated otherwise. The amounts of ingredients are given on dry basis.

EXAMPLE 1

A pre-condensate solution (component A) is prepared from:

| | |
|---|---|
| Urea-formaldehyde pre-condensate | 1500 parts |
| Insoluble pigment/filler | 250 |
| Phosphate buffer | 3 |
| Sodium hydroxide | 30 |
| Acetate buffer | 40 |
| Water | 3127 |
| | 4950 |

50 parts of vegetable (guar) gum may also be added. The pH of the solution is stabilised at 7.2.

The initiator (component B) is phosphoric acid (100 parts); it is diluted with 5000 parts water, so that on mixing A and B together, a final pH of 3.0 is obtained. The setting time is about 2 hours at ambient temperature.

The mixed solution is sprayed, at a rate of 25 g of urea-formaldehyde pre-condensate per m$^2$, on a light, sandy soil contained in shallow boxes 50 cm long and 25 cm wide. In each case the solution is sprayed onto one-half of the surface, the other half being left untouched. When setting is complete (after 2 hours) wind and water erosion tests are carried out as follows

WIND EROSION

The boxes are placed horizontally in a wind tunnel with the long side facing the direction of the oncoming wind. Air at a velocity of 40–50 km/h is directed, at an angle of 40°, at the surface of the soil for 20 seconds.

Each experiment is repeated twice and each time it is observed that the surface of the treated soil is intact whereas the top 2 cm of the untreated soil have been blown off.

WATER EROSION

The boxes are placed on a horizontal floor and inclined at an angle of 20° to the horizontal with the long side touching the floor.

Water at a pressure of 4 bars is sprayed vertically downwards on the boxes from a Schlick No. 17 nozzle located above the centre of the box at a distance of 30 cm from the floor. The total spraying time is 80 seconds, and each experiment is repeated twice. No erosion of the treated soil is observed in any of the boxes, whereas erosion of untreated soil is plainly visible in all, small particles and organic material having been washed off.

EXAMPLE 2

A solution (component A) is prepared from:

| | |
|---|---|
| Urea-formaldehyde pre-condensate | 600 parts |
| Pigment (carbon) | 10 |
| Potassium acetate | 20 |
| Water | 400 |
| | 1030 |

This solution has a pH of 7.5, and may be stored at room temperature for up to 10 months.

To 100 parts of this solution are added 10.8 parts of a 50% citric acid solution (component B) whereby the pH drops to 4.0. The setting time at 25° C. is 2 to 3 hours.

EXAMPLE 3

To 100 parts of the component A solution of Example 2 are added 6 parts of potassium hydroxide pellets. The KOH concentration is approximately 1M and the pH is 13.4. The setting time is 6 to 8 hours at 60° C., representative of surface temperatures encountered in desert areas.

EXAMPLE 4

A solution (component A) is prepared from:

| | |
|---|---|
| Urea-formaldehyde pre-condensate | 325 parts |
| Sodium alginate | 24 |
| Ethanol (32% w/w) | 483 |
| 1N sodium hydroxide | 5 |
| Water | 163 |
| | 1000 |

This solution has a viscosity of about 1000 cp at 22° C. and a pH of 10.

For use, the solution is usually diluted with water in a volume proportion of 1:10 to 1:40 (depending on the intended rate of application and spraying equipment) and mixed with 1 part of 86% phosphoric acid (component B) per 40 parts of undiluted component A. With this amount of phosphoric acid the setting time is about 24 hours at ambient temperature; it may be shortened by increasing the amount of acid added.

EXAMPLE 5

1000 parts of pre-condensate solution (component A) are prepared by dispersing 12 parts of low methoxyl pectin in 467 parts of water, adding 1 part of potassium hydroxide pellets (to neutralise free pectic acid) and 20 parts of dipotassium hydrogen phosphate trihydrate as buffer. 500 parts of a 67% aqueous solution of urea-formaldehyde pre-condensate are then added and the mixture stirred for 5 minutes. The finished solution has a viscosity of 350 cp at 22° C. and a pH of 8.3.

For use, the solution may be diluted, as described in Example 4, prior to addition of the same proportion of phosphoric acid.

The setting time is about 24 hours at ambient temperature, which may be shortened by increasing the amount of acid added.

Soil treated with the solutions described in Examples 4 and 5, at a rate of 50 kg of pre-condensate per hectare, has comparable resistance to erosion by 55 km/h winds to soil treated with 250 kg/ha of pre-condensate applied in the solution described in Example 1 (containing no gel-forming polysaccharide).

It should be noted that, for a given amount of precondensate applied per unit area of soil (for example, 100 kg/hectare), the firmness of the film formed increases with dilution of the pre-condensate; that is, the film is more resistant when the same amount of pre-condensate is, for example, applied in a 1% solution than when it is in 10% solution.

I claim:

1. A process for treating soil for temporarily resisting atmospheric erosion and being advantageous for plant growth comprising applying a film on the surface of the soil of an aqueous solution, having a pH between 2 and 5, of a formaldehyde-based pre-condensate, an acidic condensation initiator and a polysaccharide capable of forming a gel with divalent metal ions present in the soil.

2. A process according to claim 1 in which the pre-condensate is a urea-formaldehyde pre-condensate.

3. A process according to claim 1 in which the initiator is phosphoric acid.

4. A process according to claim 1 in which the polysaccharide is selected from the group consisting of alginic acid, an alginate, a low methoxyl pectin, gum karaya and gum arabic and combinations thereof.

5. A process according to claim 1 or claim 4 in which the aqueous solution contains, per 50 parts by weight of formaldehyde-based pre-condensate, from 2 to 20 parts by weight of the polysaccharide and also contains from 0 to 60 parts by weight of a hydroxy compound.

6. A process according to claim 1 or claim 4 in which the aqueous solution also contains a hydroxy compound.

7. A process according to claim 5 in which the hydroxy compound is selected from the group consisting of a lower alkanol, a glycol, a glycol ether and a polyoxy ethylene glycol ether and combinations thereof.

8. A process according to claim 1 in which the solution also contains at least one additive at a total level of up to 20% by weight of the solution.

9. A process according to claim 8 in which the additives are selected from the group consisting of a filler, a pigment, a stabiliser, a thickening agent, a fertiliser, a plant protection agent, a buffer and a mineral salt.

10. A process according to claim 9 in which the filler is selected from the group consisting of spent coffee grounds, humic acids, charcoal and a vegetable gum and combinations thereof.

11. A process according to claim 1 in which the aqueous solution is prepared by mixing an aqueous solution of the formaldehyde-based pre-condensate, having a pH stabilised within the range of 7.0 to 10.0 and containing the polysaccharide, with the condensation initiator in an amount sufficient to adjust the pH of the mixture to between 2 and 5.

12. A process according to claim 11 in which the aqueous solution of the precondensate also contains a hydroxy compound.

13. A process according to claim 1 in which the condensation is completed within 1.5 to 24 hours.

14. A process according to claim 1 in which the solution is applied by spraying.

* * * * *

UNITED STATES PATENT AND TRADEMARK OFFICE
CERTIFICATE OF CORRECTION

PATENT NO. : 4,743,288

DATED : May 10, 1988

INVENTOR(S) : Pierre Hirsbrunner

It is certified that error appears in the above-identified patent and that said Letters Patent is hereby corrected as shown below:

Column 2, line 24, "$(C_1-C_{4-})$" should be --$(C_1-C_4)$--.

Column 3, line 54, delete "the film" and insert --it--; and then delete the word "it" which appears in line 54 of the patent and insert --the film--.

Column 4, line 21, after "follows", insert --:--.

Column 4, lines 59 and 66, "C." should be --C--.

Column 5, lines 12 and 32, "C." should be --C--.

--C--.

Signed and Sealed this

Fourth Day of October, 1988

Attest:

DONALD J. QUIGG

Attesting Officer

Commissioner of Patents and Trademarks